DANIEL D. T. BROWN.

Improvement in Potato-Diggers.

No. 127,676.  Patented June 11, 1872.

Witnesses:
D. S. Johnston
A. H. Sargent

Inventor:
D. D. T. Brown
By W. S. Loughborough & Co
Attys.

UNITED STATES PATENT OFFICE.

DANIEL D. T. BROWN, OF MUMFORD, NEW YORK.

IMPROVEMENT IN POTATO-DIGGERS.

Specification forming part of Letters Patent No. 127,676, dated June 11, 1872.

SPECIFICATION.

Be it known that I, DANIEL D. T. BROWN, of Mumford, in the county of Monroe and State of New York, have invented certain improvements in Potato-Diggers, of which the following is a specification:

My invention consists mainly in the combination of side plows for removing portions of the hill, a cutter or share for lifting the center portion, and separator chains and stirrers for loosening the soil and throwing the tubers upon the surface. It also consists in a hook and revolving clearer for collecting vines.

Figure 1:
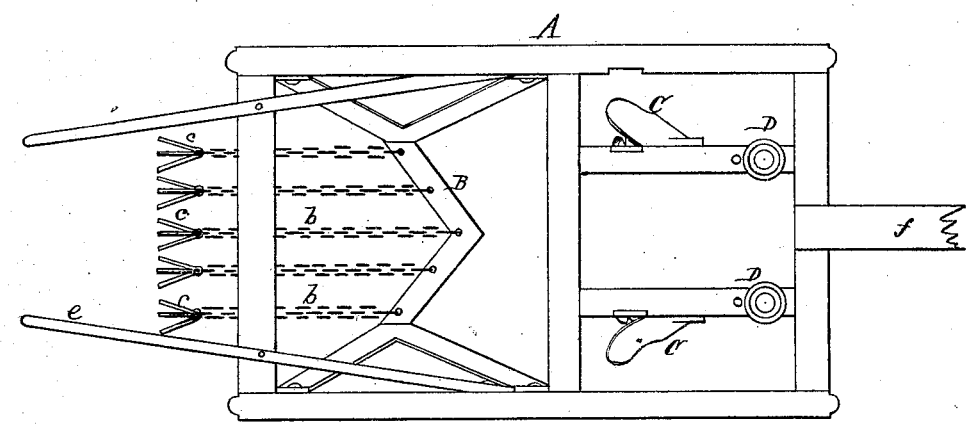
Figure 2:
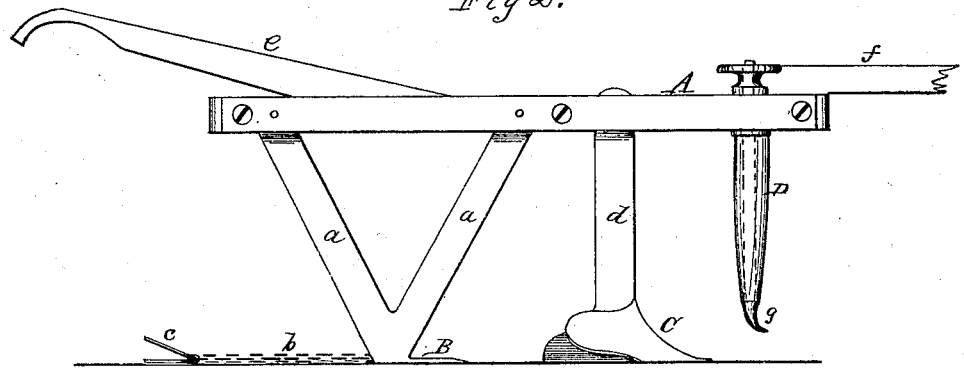

In the drawing, Figure 1 is a plan view of my device. Fig. 2 is a side elevation.

A is a frame, made in any convenient form to support the working-parts of the machine, and provided with guiding handles $e$ and tongue $f$, to the latter of which the team is attached. C C are plows, attached to the frame A by means of shanks $d$. These plows are located at a sufficient distance apart to remove the sides of the hills without disturbing the potatoes. B is a horizontal share or knife, which is preferably triangular in outline, as shown in Fig. 1, and it is securely fastened to the frame of the machine by arms $a$. This share is set so as to run under the hills and lift and disturb their contents, and to its rear I attach, in a suitable manner, chains $b$, extending backward to a considerable distance. These chains are located near together, and thereby agitate and break up the soil lifted by the share B, separating the potatoes therefrom. To complete this separation, however, and expose the tubers to view on the surface, I attach stirrers $c$ to the extremity of the chains, composed of several prongs projecting at an angle from the line of draft. These agitators are drawn into the soil by the share B, and being quite near together, the earth is lifted by the latter, and passing over and through the chains and agitators, is thus thoroughly disturbed and sifted, leaving the tubers upon the surface. D D are studs projecting down near the surface of the ground and having hooks $g$ at the lower extremity. The body D of the studs revolves loosely upon a central spindle, and the hooks gather the vines lying upon the ground and lift them, the advancing movement of the machine forcing them between the studs D and plows C, to be afterward lifted and the soil shaken therefrom by the share B. The revolving part of the studs permits the ready passage of the vines.

If necessary, gauge-wheels may be used upon the frame A to adjust the depth to which the share B and side plows enter the soil. Provision may also be made to adjust the side plows both vertically and laterally, if found desirable.

What I claim is—

1. The lifting-share B, chains $b$, and separators or agitators $c$, in combination with the side plows C, arranged to operate substantially in the manner and for the purposes set forth.

2. The vine-hooks, in combination with the rollers, operating substantially as described.

DANIEL D. T. BROWN.

Witnesses:
F. H. CLEMENT,
A. H. SARGENT.